United States Patent
Okuda et al.

(10) Patent No.: US 7,983,154 B2
(45) Date of Patent: Jul. 19, 2011

(54) METHOD FOR INCREASING/REDUCING BAND DATA RATE OF RING-BASED NETWORK AND NODE APPARATUS OF THE RING-BASED NETWORK

(75) Inventors: Takashi Okuda, Kawasaki (JP); Yoichi Konuma, Kawasaki (JP); Koichi Saiki, Kawasaki (JP); Yukihiro Hayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1015 days.

(21) Appl. No.: 11/319,047

(22) Filed: Dec. 27, 2005

(65) Prior Publication Data
US 2007/0070899 A1 Mar. 29, 2007

(30) Foreign Application Priority Data
Sep. 28, 2005 (JP) .................. 2005-282097

(51) Int. Cl.
*H04J 3/16* (2006.01)
(52) U.S. Cl. .................. 370/222; 370/248
(58) Field of Classification Search .......... 370/216, 370/222, 228, 229, 230, 235, 236, 241, 242, 370/248, 252, 257–258, 254, 400–405
See application file for complete search history.

(56) References Cited

U.S. PATENT DOCUMENTS

| | | | |
|---|---|---|---|
| 7,031,256 B2 * | 4/2006 | Hamlin et al. | 370/230 |
| 7,307,946 B2 * | 12/2007 | Okuno | 370/222 |
| 7,420,922 B2 * | 9/2008 | Bruckman et al. | 370/236 |
| 7,570,673 B2 * | 8/2009 | Iwabuchi et al. | 370/535 |
| 2006/0062161 A1 * | 3/2006 | Tang et al. | 370/258 |
| 2007/0036181 A1 * | 2/2007 | Nagasawa | 370/536 |
| 2007/0070923 A1 * | 3/2007 | Honma et al. | 370/258 |

FOREIGN PATENT DOCUMENTS

| | | |
|---|---|---|
| JP | 2002-359627 | 12/2002 |
| JP | 2004-153623 | 5/2004 |
| JP | 2004-236205 | 8/2004 |
| JP | 2004-242194 | 8/2004 |

OTHER PUBLICATIONS

Japanese Office Action dated Nov. 16, 2010, from the corresponding Japanese Application.

* cited by examiner

*Primary Examiner* — Aung S Moe
*Assistant Examiner* — Feben Haile
(74) *Attorney, Agent, or Firm* — Katten Muchin Rosenman LLP

(57) ABSTRACT

The present invention discloses a method including the steps of a) confirming the status of a path corresponding to each node apparatus in the ring network by using a predetermined control information that includes a function of adding/deleting a predetermined path on a physical layer, b) instructing each node apparatus to add/delete the predetermined path by using the predetermined control information when the status of the path corresponding to each node apparatus is confirmed to be normal, c) reporting completion of the addition/deletion of the predetermined path to each node apparatus by using the predetermined control information when the addition/deletion of the predetermined path is adequately performed by each node apparatus, and d) reporting the addition/deletion of the predetermined path to a ring application function included in the ring application of the data link layer when the completion of the addition/deletion of the predetermined path is adequately reported by each node apparatus.

8 Claims, 12 Drawing Sheets

FIG.6

| | | BIT | |
|---|---|---|---|
| | | b0~b1 | b4~b7 |
| MULTI-FRAME | 1 | | |
| | 2 | | |
| | 3 | | |
| | 4 | | |
| | 5 | | RESERVED |
| | 6 | | RESERVED |
| | 7 | | |
| | 8 | | |
| | 9 | | |
| | 10 | | |
| | 11 | | |
| | 12 | | RESERVED |
| | 13 | | RESERVED |
| | 14 | | RESERVED |
| | 15 | | |
| | 16 | | |

■ : DEFINED BYTE    □ : RESERVED BYTE

METHOD FOR INCREASING/REDUCING BAND DATA RATE OF RING-BASED NETWORK AND NODE APPARATUS OF THE RING-BASED NETWORK

BACKGROUND OF THE INVENTION

1. Field of the Invention

The present invention generally relates to a method for increasing/reducing the band data rate of a ring-based network and a node apparatus such as an ADM (Add Drop Multiplexer) of the ring-based network.

2. Description of the Related Art

FIG. 1 shows an exemplary configuration of a ring-based network on which RPR operates on SDH/SONET. By forming bi-directional paths between each adjacent node apparatus (ADM apparatus) 1A-1D as shown in FIG. 1, bi-directional paths having uniform bandwidth through the node apparatuses 1A-1D can be obtained. An RPR ring is provided on the bi-directional paths.

FIG. 2 is a schematic diagram for describing an RPR function. In FIG. 2, the path connecting each node apparatus 1A, 1B is virtually a single band having plural SDH/SONET bands (paths) bundled together to form a VCG (Virtual Concatenation Group). This virtual band serves as an RPR bandwidth (i.e. an upper limit of an Ethernet (Registered Trademark) transmission path). With reference to FIG. 2, each node apparatus 1A, 1B includes an RPR processing part. The RPR processing part adjusts the amount of data (frames) inserted from an L2SW (Layer-2 Switch) to the RPR ring so that the data flowing into the RPR ring does not exceed an insertable data bandwidth (insertable data capacity) of the RPR ring (i.e. so that the total traffic (bandwidth) of the frames inserted by each node does not exceed the threshold of the RPR bandwidth). Furthermore, the RPR processing part monitors the frames passed from an adjacent node apparatus and the frames inserted from the L2SW, and transmits a control signal to an upper level apparatus (from which the frames are inserted) when the amount of frames flowing in the RPR ring exceeds the RPR bandwidth.

Meanwhile, there is another technology referred as an LCAS (Link Capacity Adjustment Scheme) function which serves to increase/reduce the bandwidth of a SDH/SONET network (add/delete members of a virtual concatenation group). FIG. 3 is a schematic diagram for describing the LCAS function. In a case where a transmission path 2a is currently used between the node apparatus 1A and the node apparatus 1B as shown in FIG. 3, another transmission path 2b is set (added) as a member of the VCG between the node apparatus 1A and the node apparatus 1B by using a control frame including information (overhead byte) referred to as H4 byte. After the transmission path 2b is set (added) as a member of the VCG, the increase of bandwidth is determined by monitoring abnormality thereof. The decrease of bandwidth is determined in a likewise manner.

It is to be noted that a member of the VCG refers to a unit for increasing/decreasing the bandwidth of the VCG.

In one related art case (Japanese Laid-Open Patent Application No. 2002-359627), there is disclosed a protection method employing LCAS in a case of failure and a ring apparatus using the protection method. In another related art case (Japanese Laid-Open Patent Application No. 2004-236205), there is disclosed a transmission apparatus which can separately perform ring switching at the SONET/SDH level and ring switching at the RPR level. In yet another related art case (Japanese Laid-Open Patent Application No. 2004-242194), there is disclosed an RPR network system which does not require, for example, a flag for identifying addition of a MAC (Media Access Control) address/capsulation of a frame.

Meanwhile, owing to the current spread/growth of Ethernet services, there are many occasions where the capacities of a ring-based network (e.g. ADM system) are adaptively changed in accordance with the user's needs, and there is a demand for achieving increase/decrease of physical bandwidth without affecting the traffic being carried. Nevertheless, the aforementioned related art cases have the following problems.

(1) For example, in a case of using the RPR function in an ADM system, the complicated operation of the RPR functions makes it difficult to increase/reduce the band data rate without affecting a prescribed service (e.g. Ethernet service). In order to achieve this, bandwidth (that is expected to be used) is additionally prepared before commencing the Ethernet service, for example, and the amount of data inflow is adjusted by a corresponding L2SW. With this method, however, the RPR function, which is meant to make efficient use of bandwidth, cannot be sufficiently utilized.

(2) Since the RPR function of, for example, an ADM system functions on a predetermined band (e.g. SDH), it is necessary to remove a path in order to increase the data rate of the predetermined band. For example, in a case of increasing a band of 150 Mps to a band of 300 Mbps, it is first necessary to remove (eliminate) the registration information of the band of 150 Mbps in order to increase the data rate to 300 Mbps. Such temporary interruption of service may cause adverse effects on the end user.

(3) The RPR function serves to insert a guaranteed amount of signals having predetermined priority corresponding to each interface within the extent of a designated band (e.g. SDH). However, in a case where the amount of traffic for the entire band is small, the RPR function can allow insertion of traffic exceeding the guaranteed amount. Furthermore, the RPR function constantly monitors a predetermined band (e.g. SDH) and the amount of packets inserted thereto and adjusts the amount of traffic (inserted packets). Therefore, in a case where the bandwidth of a given section is increased, the amount of traffic may increase only at the given section. Accordingly, when the inserted packets reach another section, the control for the incoming flow temporarily loses balance. This will initiate an automatic control for adjusting the amount of traffic control and eliminating transmission information. Thereby, packets (traffic) inserted from other interfaces are temporarily prevented from being inserted. Hence, in a case of increasing/decreasing the bandwidth between each section (interval) by using the LCAS function, the increase/decrease of bandwidth has an effect on the entire system. In other words, in a case where an RPR band is provided by bundling multiple bands (e.g. SDH) together, a frame is spontaneously transmitted to an increased/decreased band (e.g. SDH) since the RPR is unable to designate the band to which a frame is to be transmitted. This results in frame loss.

(4) The RPR function provides a logical ring formed by disposing a band (e.g. SDH) between sections that are physically connected by nodes (e.g. ADM), and uses the ring as a whole for adjusting the amount of traffic. Meanwhile, the LCAS function is a technology applied to, for example, SDH for increasing/decreasing the data rate of a path without causing any disconnection. It is, however, difficult to achieve cooperative operations between the RPR function and the LCAS function since the RPR function and the LCAS function operate in different layers. That is, the RPR function is a technology which uses a ring as a whole, and operates in a MAC layer (corresponding to Layer 2). The LCAS function is a technology for setting the bandwidth (e.g. SDH) between each node (technology standardized for changing the bandwidth between each section), and operates in a layer (corresponding to Layer 1) different from that of the RPR function. Although the LCAS function uses the H4 byte (physical layer) of, for example, SDH for controlling the increase/decrease of bandwidth, the LCAS function has no method for transmitting the control to Ethernet (MAC layer) and is unable to change the bandwidth of a ring as a whole. Even if the LCAS function were able to change the bandwidth of the ring as a whole, the starting node would be the terminal node (starting node=terminating node), and there would be no method for recognizing this relationship.

Accordingly, in a conventional ring-based network (e.g. ADM system) having an RPR function, it is difficult to increase/reduce the data rate without any disconnection of service. This is a complicated task for the user (operator), in which the user (operator) is to decide whether to 1) sacrifice the efficient use of bandwidth, 2) change the bandwidth along with disconnecting the line, or 3) ignore the temporary effect on the service.

SUMMARY OF THE INVENTION

The present invention provides a method for increasing/reducing the band data rate of a ring-based network and a node apparatus that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a method for increasing/reducing the band data rate of a ring-based network and a node apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, one aspect of the invention provides a method for controlling a physical bandwidth of a ring network by using a ring application of a data link layer that is operated on a physical layer, the ring network including a plurality of node apparatuses, the method including the steps of: a) confirming the status of a path corresponding to each node apparatus in the ring network by using predetermined control information that includes a function of adding/deleting a predetermined path on the physical layer; b) instructing each node apparatus to add/delete the predetermined path by using the predetermined control information when the status of the path corresponding to each node apparatus is confirmed to be normal; c) reporting completion of adding/deleting the predetermined path to each node apparatus by using the predetermined control information when the addition/deletion of the predetermined path is adequately performed by each node apparatus; and d) reporting the addition/deletion of the predetermined path to a ring application function included in the ring application of the data link layer when the completion of the addition/deletion of the predetermined path is adequately reported by each node apparatus.

In the method according to an embodiment of the present invention, the path status confirmation of said step a) may be conducted in accordance with a path addition/deletion instruction from a network management system, wherein the path addition/deletion instruction is based on the function of adding/deleting the predetermined path on the physical layer.

In the method according to an embodiment of the present invention, the method may further include a step of: reporting completion of the addition/deletion of the predetermined path to the network management system when the addition/deletion of the predetermined path is adequately reported to the ring application function.

In the method according to an embodiment of the present invention, the path status confirmation of said step a) may be conducted in accordance with a path addition/deletion instruction from an upper level network management system, wherein the path addition/deletion instruction is based on the ring application function included in the ring application of the data link layer.

In the method according to an embodiment of the present invention, the method may further include a step of: reporting completion of the addition/deletion of the predetermined path to the network management system when the addition/deletion of the predetermined path is adequately reported to the ring application function.

In the method according to an embodiment of the present invention, the path of the physical layer may include at least one of a SDH band and a SONET band.

In the method according to an embodiment of the present invention, the function of adding/deleting the predetermined path on the physical layer may include an LCAS function, wherein the use of the predetermined control information includes the use of H4 byte information.

In the method according to an embodiment of the present invention, the ring application function may include in the ring application of the data link layer includes an RPR function.

Furthermore, the present invention provides a node apparatus for controlling a physical bandwidth of a ring network by using a ring application of a data link layer that is operated on a physical layer, the ring network including a plurality of node apparatuses, the node apparatus including: a path status confirming part for confirming the status of a path corresponding to each node apparatus in the ring network by using predetermined control information that includes a function of adding/deleting a predetermined path on the physical layer; a path addition/deletion instructing part for instructing each node apparatus to add/delete the predetermined path by using the predetermined control information when the status of the path corresponding to each node apparatus is confirmed to be normal; a path addition/deletion completion reporting part for reporting completion of the addition/deletion of the predetermined path to each node apparatus by using the predetermined control information when the addition/deletion of the predetermined path is adequately performed by each node apparatus; and a path addition/deletion reporting part for reporting the addition/deletion of the predetermined path to a ring application function included in the ring application of the data link layer when the completion of the addition/deletion of the predetermined path is adequately reported by each node apparatus.

Other objects and further features of the present invention will be apparent from the following detailed description when read in conjunction with the accompanying drawings.

BRIEF DESCRIPTION OF THE DRAWINGS

FIG. 6 is a schematic diagram showing an example of a format of H4 byte information used for LCAS control according to an embodiment of the present invention;

DESCRIPTION OF THE PREFERRED EMBODIMENTS

In the following, embodiments of the present invention are described with reference to the accompanying drawings.

Figure 1:
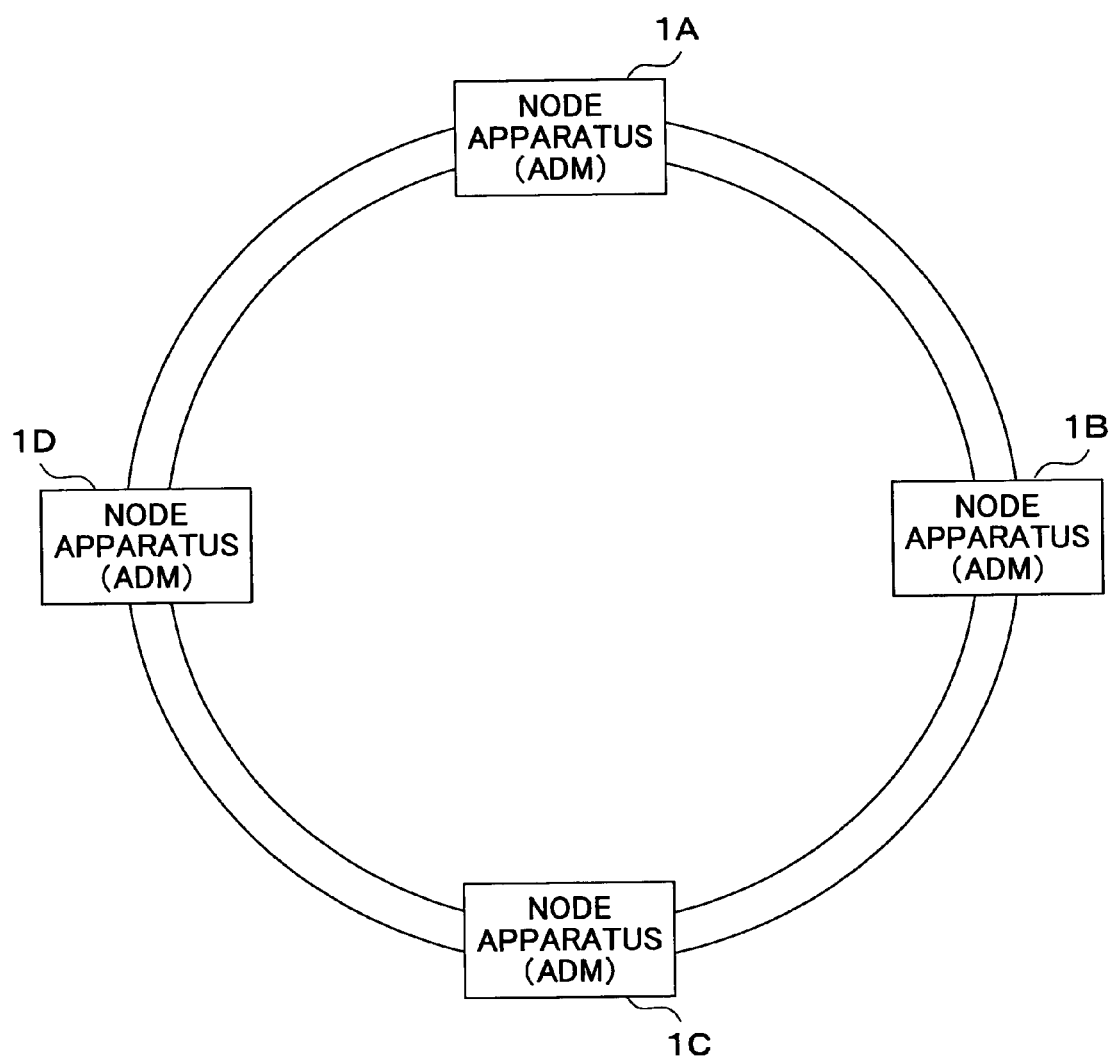
FIG. 1 is a schematic diagram showing an exemplary configuration of a ring-based network having RPR operating on SDH/SONET.
Figure 2:
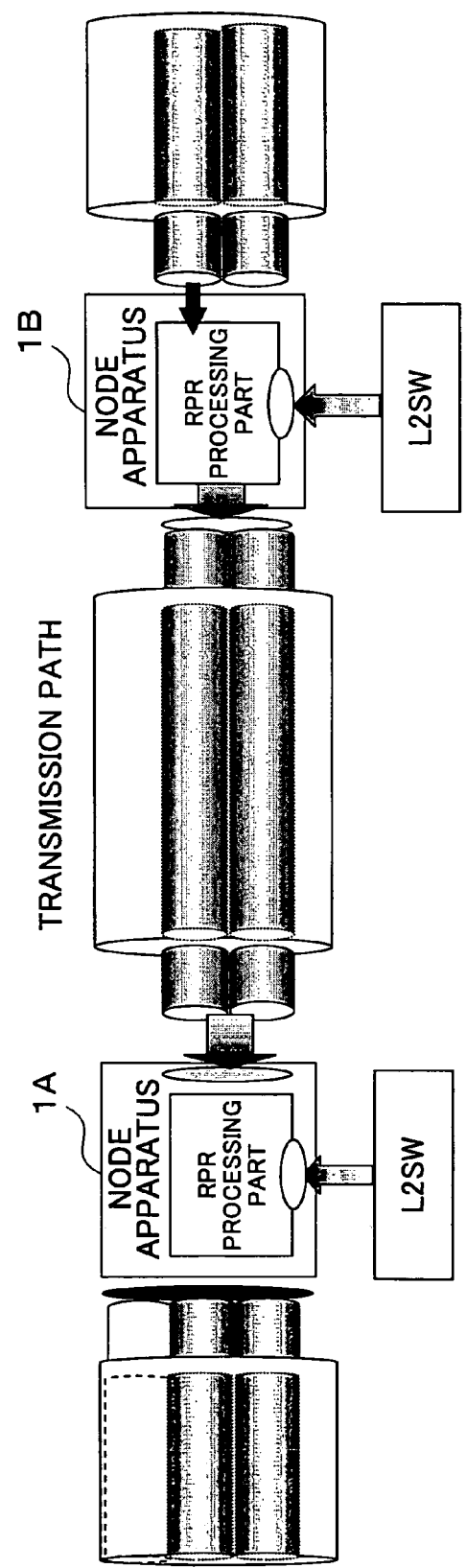
FIG. 2 is a schematic diagram for describing an RPR function.
Figure 3:
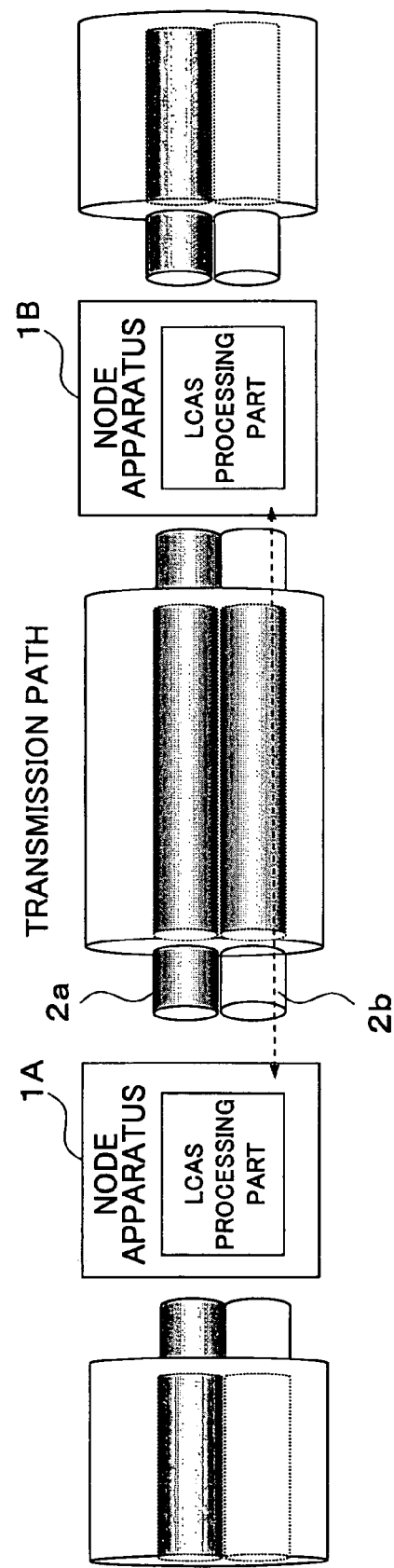
FIG. 3 is a schematic diagram for describing an LCAS function.
Figure 4:
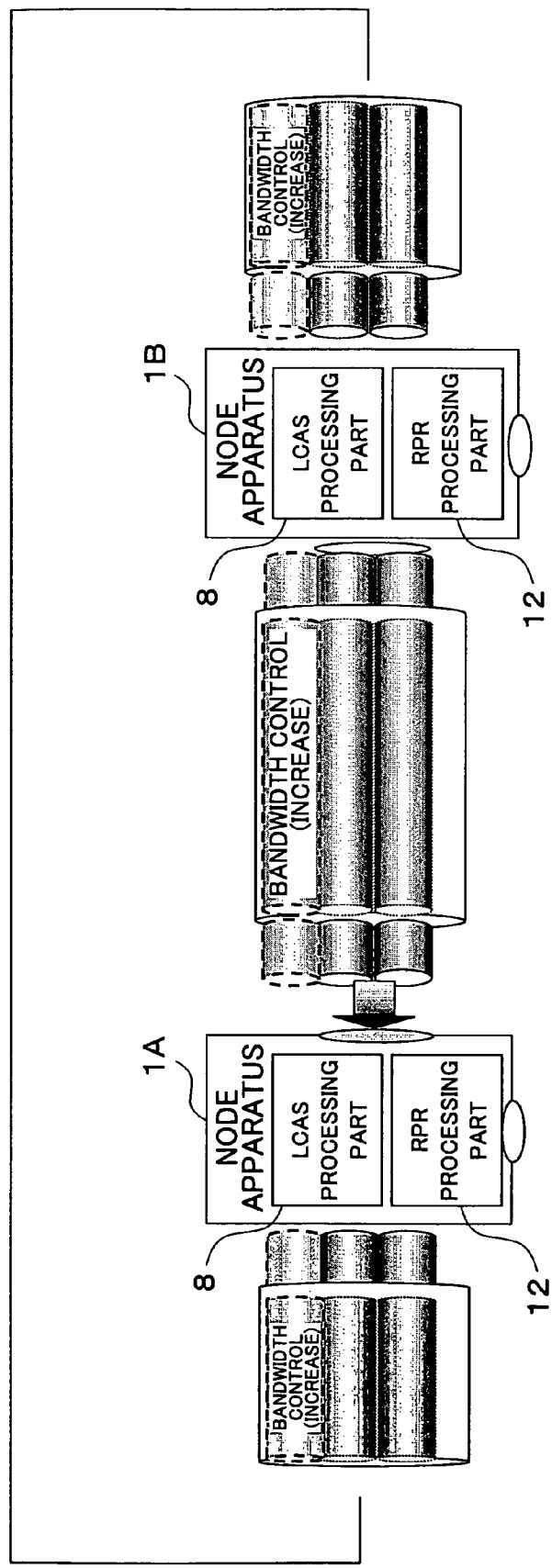
FIG. 4 is a schematic diagram for describing an exemplary operation (method) according to an embodiment of the present invention.

FIG. 4 is a schematic diagram for describing an exemplary operation of the present invention. In FIG. 4, adjacent node apparatuses 1A and 1B change bandwidth therebetween by using the LCAS function of an LCAS processing part 8 provided therein, respectively. At this stage, the changed bandwidth information does not reach the RPR function, and has no affect on RPR control. After the normality of each section in the ring is confirmed by using the LCAS processing part 8, the change of bandwidth is reported to the RPR processing part 12 by transmitting control information, and the RPR function is performed in the changed band.

Figure 5:
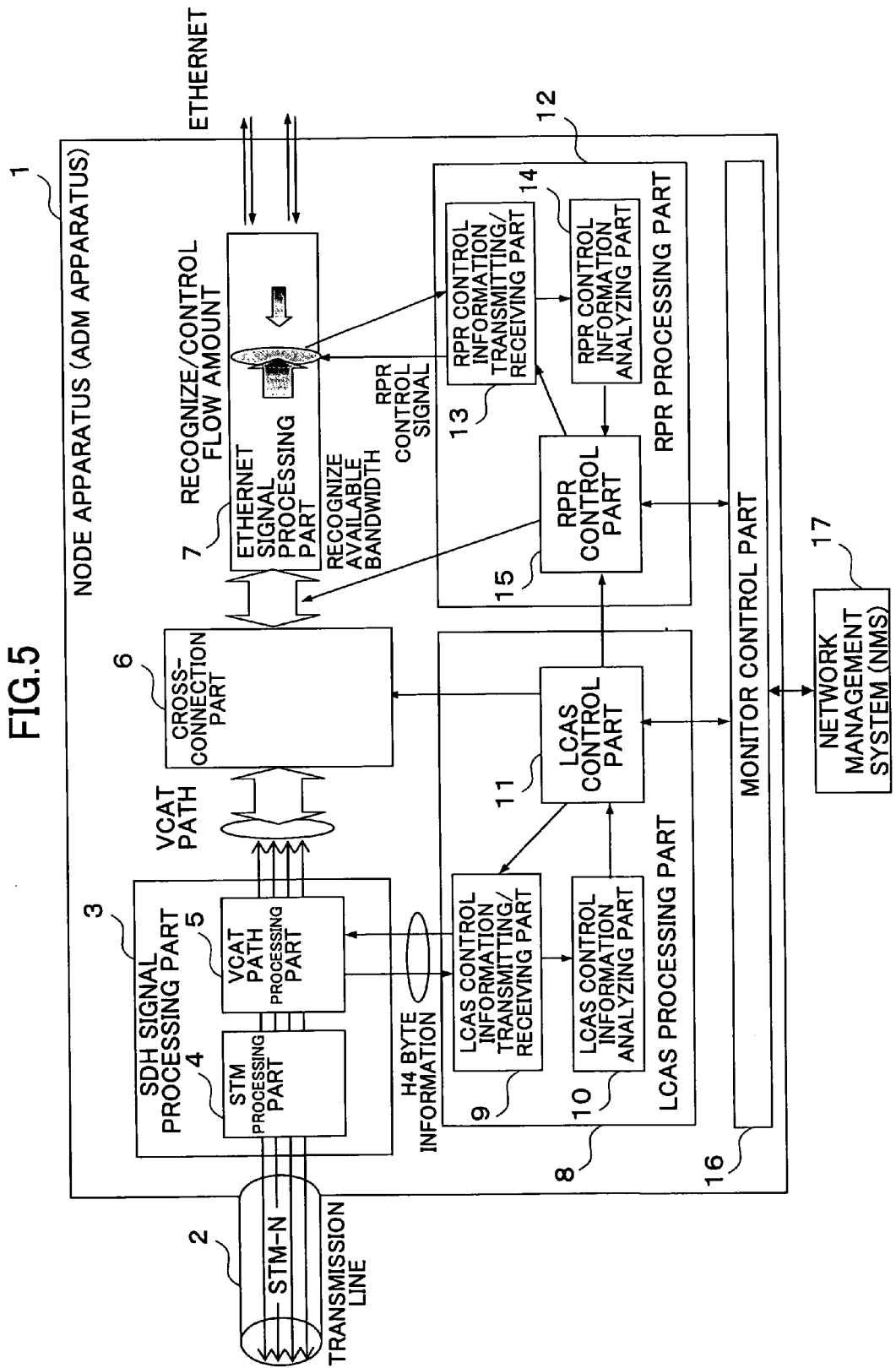
FIG. 5 is a schematic diagram showing an exemplary configuration of a node apparatus according to an embodiment of the present invention.

FIG. 5 is a schematic diagram showing an exemplary configuration of a node apparatus 1 according to an embodiment of the present invention. In FIG. 5, the node apparatus 1 is connected to an adjacent node apparatus via a transmission path (e.g. optical fiber). The node apparatus 1 includes, for example: an SDH signal processing part 3 including an STM processing part 4 for performing various processes on STM (Synchronous Transport Module) and a VCAT path processing part 5 for performing various processes on VCAT (Virtual Concatenation); a cross-connection part 6 for performing cross-connection between signals on the SDH (SDH signals) and signals on the Ethernet (Ethernet signals); and an Ethernet signal processing part 7 for performing various processes on Ethernet signals transmitted from an outside Ethernet interface. Furthermore, the node apparatus 1 also includes, for example: an LCAS processing part 8 including an LCAS control information transmitting/receiving part 9, an LCAS control information analyzing part 10, and an LCAS controlling part 11; an RPR processing part 12 including an RPR control information transmitting/receiving part 13, an RPR control information analyzing part 14, and an RPR control part 15; and a monitor control part 16 performing monitor control according to instructions from an outside network management system 17.

Two exemplary methods for performing the method of the present invention are described below. There is a slight difference between the two methods regarding the functions of the LCAS processing part 8 and the RPR processing part 12.

(Method 1) Triggering a path addition/deletion process by using LCAS control information (i.e. initiating path addition/deletion by using RPR control information, performing the path addition/deletion by using LCAS control information, reporting the path addition/deletion with RPR control information, and conducting an RPR control operation)

(Method 2) Triggering a path addition/deletion process by using RPR control information (i.e. initiating path addition/deletion by using LCAS control information, performing the path addition/deletion by using LCAS control information, reporting the path addition/deletion with RPR control information, and conducting an RPR control operation)

[Mechanism of Node Apparatus 1 in a Case where Method 1 is Used]

(1) The LCAS control information transmitting/receiving part 9 includes the functions described below.

A function of receiving H4 byte information from another node apparatus via the VCAT path processing part 5, and transferring the received H4 byte information to the LCAS control information analyzing part 10

A function of transferring H4 byte information to the VCAT path processing part 5 according to an instruction(s) from the LCAS control section.

(2) The LCAS control information analyzing part 10 includes the functions described below.

A function of performing below analysis on the LCAS control information inside the H4 byte information received from the LCAS control information transmitting/receiving 9
  a. determining whether the node apparatus itself is a terminal point or a relay point
  b. recognizing the changed data rate of VCAT function
  c. determining content of control (checking the status of a path (IDLE), adding/deleting a path (ADD/DELETE))

A function of transferring the results of the analysis to the LCAS control part 11

(3) The LCAS control part 11 includes the functions described below.

A function of transmitting the instructions below based on the received analysis results.
  a. performing path setting control with respect to the cross-connection part 6
  b. performing path setting control with respect to the VCAT path processing part 5
  c. directing the transmission of H4 byte control signal to the LCAS control information transmitting/receiving part 9
  d. directing the transmission of LCAS control signal to the LCAS control information transmitting/receiving part 9
  e. sending the allowing of increase/decrease of bandwidth to the RPR control part 15

A function of performing the processes below in accordance with the controls of the network management system 17
  a. analyzing the starting point/terminating point b. analyzing the data rate to be changed
c. directing the transmission of LCAS control information according to the analyzed results A function of providing the apparatus ID of the starting point or the number of hops remaining in the ring (other nodes remaining in the ring) to the counter (node counter, remaining node counter) for enabling confirmation of normality upon transmitting LCAS information to other node apparatuses (As an alternative method for confirming/controlling the normality of the entire node apparatuses, the OPS and the normality of each node apparatus can be confirmed and the normality of all the sections is determined solely according to the OPS)

(4) The RPR control information transmitting/receiving part 13 includes the functions described below.

A function of reporting the amount of packets flowing into the Ethernet signal processing part 7 (from the interface or the cross-connection part 6) to the RPR control information analyzing part 14

A function of distinguishing between "RPR Topology Information", "OAM (Operations, Administration, and Maintenance) Information", "Fairness Information", and "RPR Availabile Band Information" based on Control Type included in the RPR control frame received from the RPR control information transmitting/receiving part 13 of another node apparatus, and transferring the control type information to the RPR control information analyzing part 14.

(5) The RPR control information analyzing part 14 includes the functions described below.

A function of performing the analysis below according to the control type information transferred from the RPR control information transmitting/receiving part 13 and the amount of packets flowing into the Ethernet signal processing part 7.
  a. determining whether a relationship of "RPR bandwidth≦amount of packets flowing into the Ethernet signal processing part 7 from the interface and the cross-connection part 6" is satisfied
  b. determining whether there is any change of RPR status owing to failure in the ring by referring to the RPR topology information
  c. determining whether there is any occurrence of failure in a particular part by referring to the OAM information
  d. determining whether there are any available bands in the RPR ring by referring to the fairness information
  e. determining whether there are any VCAT paths to which Ethernet frames can be transmitted by referring to the RPR available band information (6) The RPR control part 15 includes the functions described below.

A function of transmitting the instructions described below based on the received analysis results
  a. instructing the RPR control information transmitting/receiving part 13 to control the inflowing amount of Ethernet signal frames
  b. instructing the RPR control information transmitting/receiving part 13 to transmit RPR control frames
  c. instructing the Ethernet signal processing part 7 to control the transmission amount of Ethernet signal frames
  d. instructing the RPR control information transmitting/receiving part 13 to control the inflowing amount of Ethernet signal frames
  e. instructing the RPR control information transmitting/receiving part 13 to allow transmission to a designated VCAT path A function of stopping/starting the transmission of data to a designated LCAS band (band targeted for increase/reduction) during RPR control

[Mechanism of Node Apparatus 1 where Method 2 is Used]

(1) The LCAS control information transmitting/receiving part 9 includes the functions described below.

A function of receiving H4 byte information transferred from another node apparatus via the VCAT path processing part 5 and transferring the H4 byte information to the LCAS control information analyzing part 10

A function of transferring H4 byte information to the VCAT path processing part 5 according to the instructions from the LCAS control section part 11

(2) The LCAS control information analyzing part 10 includes the functions described below.

A function of performing the analysis below according to the LCAS control information inside the H4 byte information received from the LCAS control information transmitting/receiving part 9.
  a. determining whether the node apparatus itself is a terminal point or a relay point
  b. recognizing the changed data rate of VCAT function
  c. determining content of control (checking the status of a path (IDLE), adding/deleting a path (ADD/DELETE))

A function of transferring the results of the analysis to the LCAS control part 11

(3) The LCAS control part 11 includes the functions described below.

A function of transmitting the instructions below based on the received analysis results.
  a. performing path setting control with respect to the cross-connection part 6
  b. performing path setting control with respect to the VCAT path processing part 5
  c. directing transmission of H4 byte control to the LCAS control information transmitting/receiving part 9
  d. directing transmission of LCAS control signal to the LCAS control information transmitting/receiving part 9
  e. directing the allowing of increase/decrease of bandwidth to the RPR control part 15

Figure 7:
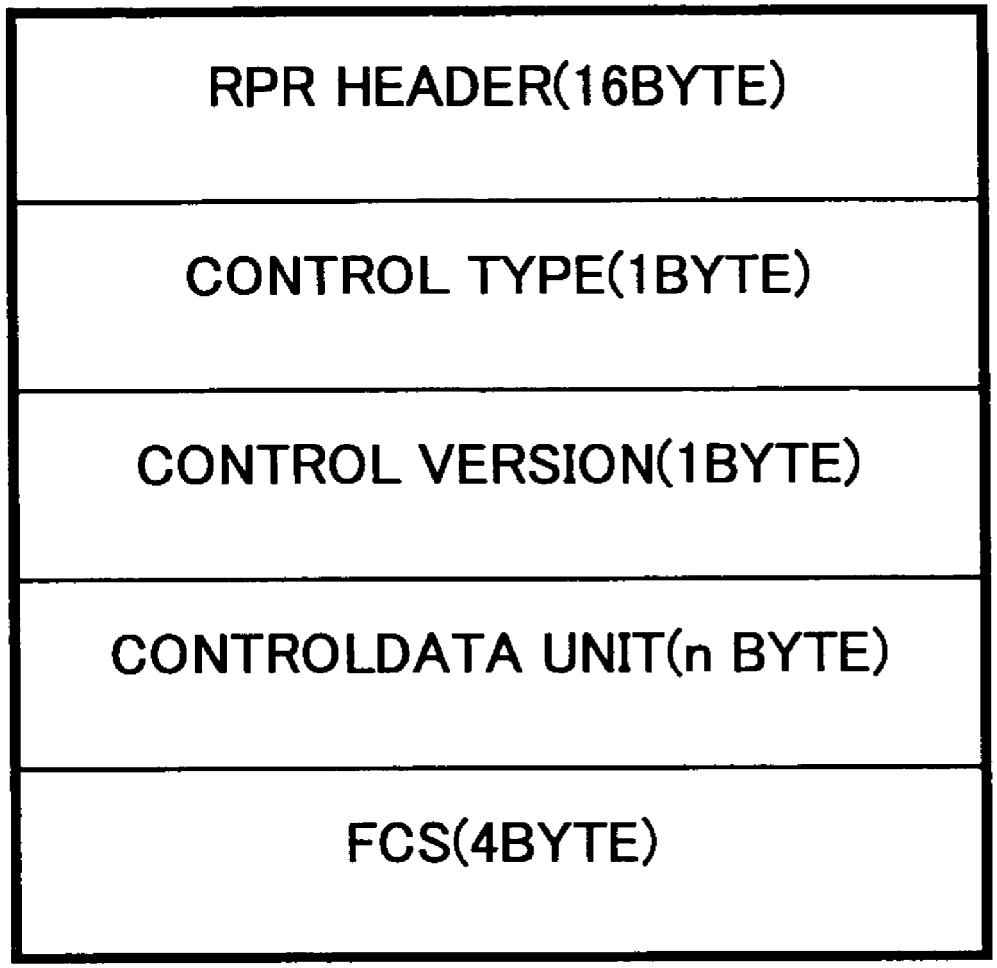
FIG. 7 is a schematic diagram showing an example of a format of an RPR control frame used for RPR control according to an embodiment of the present invention.
Figure 8:
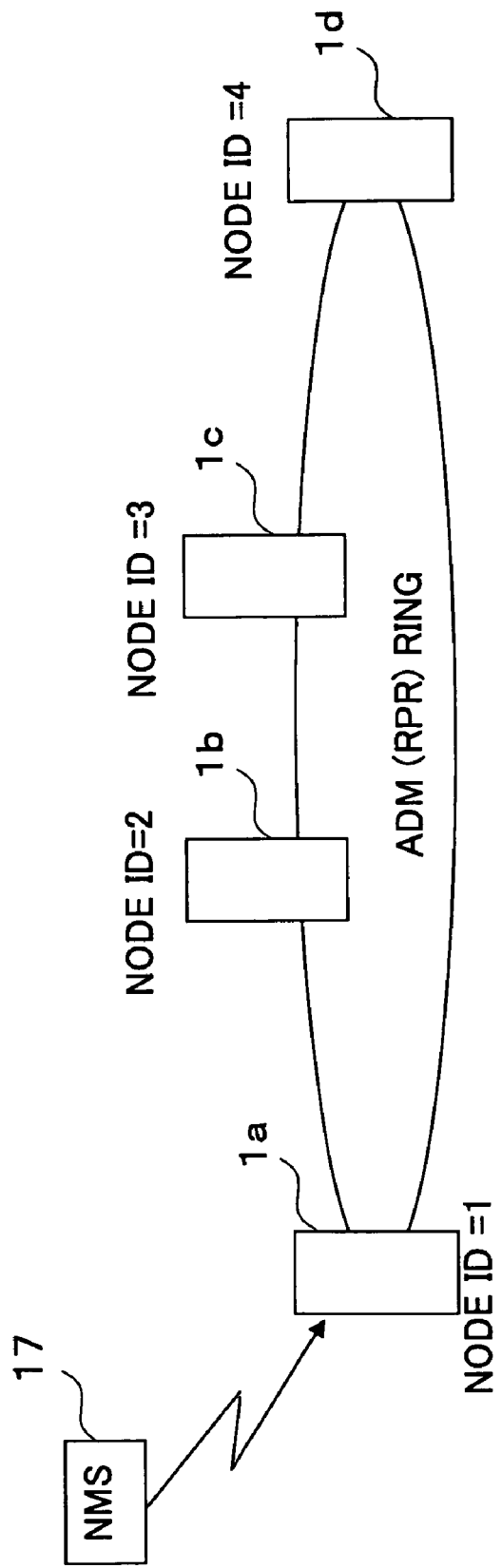
FIG. 8 is a schematic diagram showing an arrangement of node apparatuses according to an embodiment of the present invention.
Figure 9:
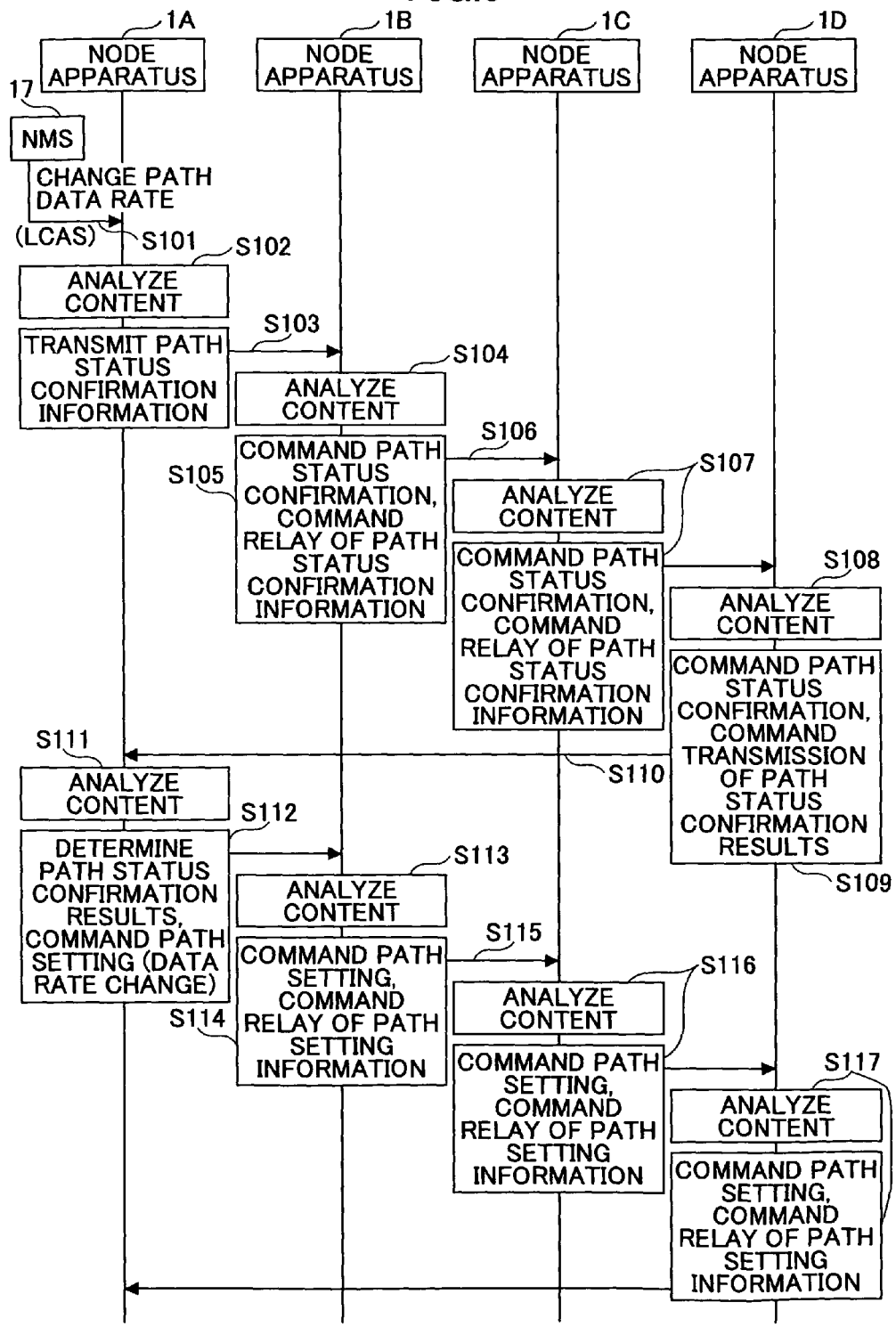
FIG. 9 is a flowchart showing an operation using Method 1 according to an embodiment of the present invention (Part 1)
Figure 10:
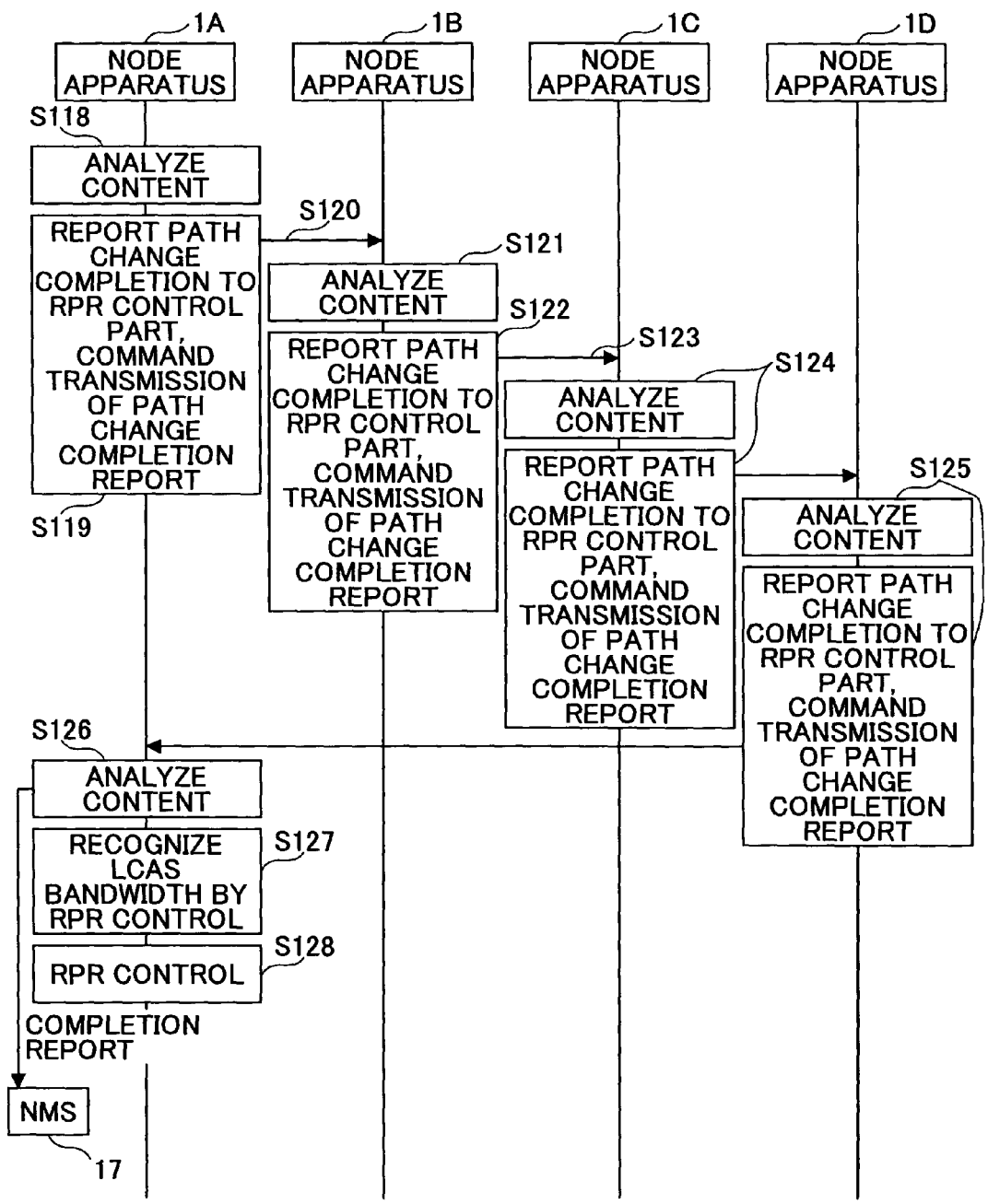
FIG. 10 is a flowchart showing an operation using Method 1 according to an embodiment of the present invention (Part 2)
Figure 11:
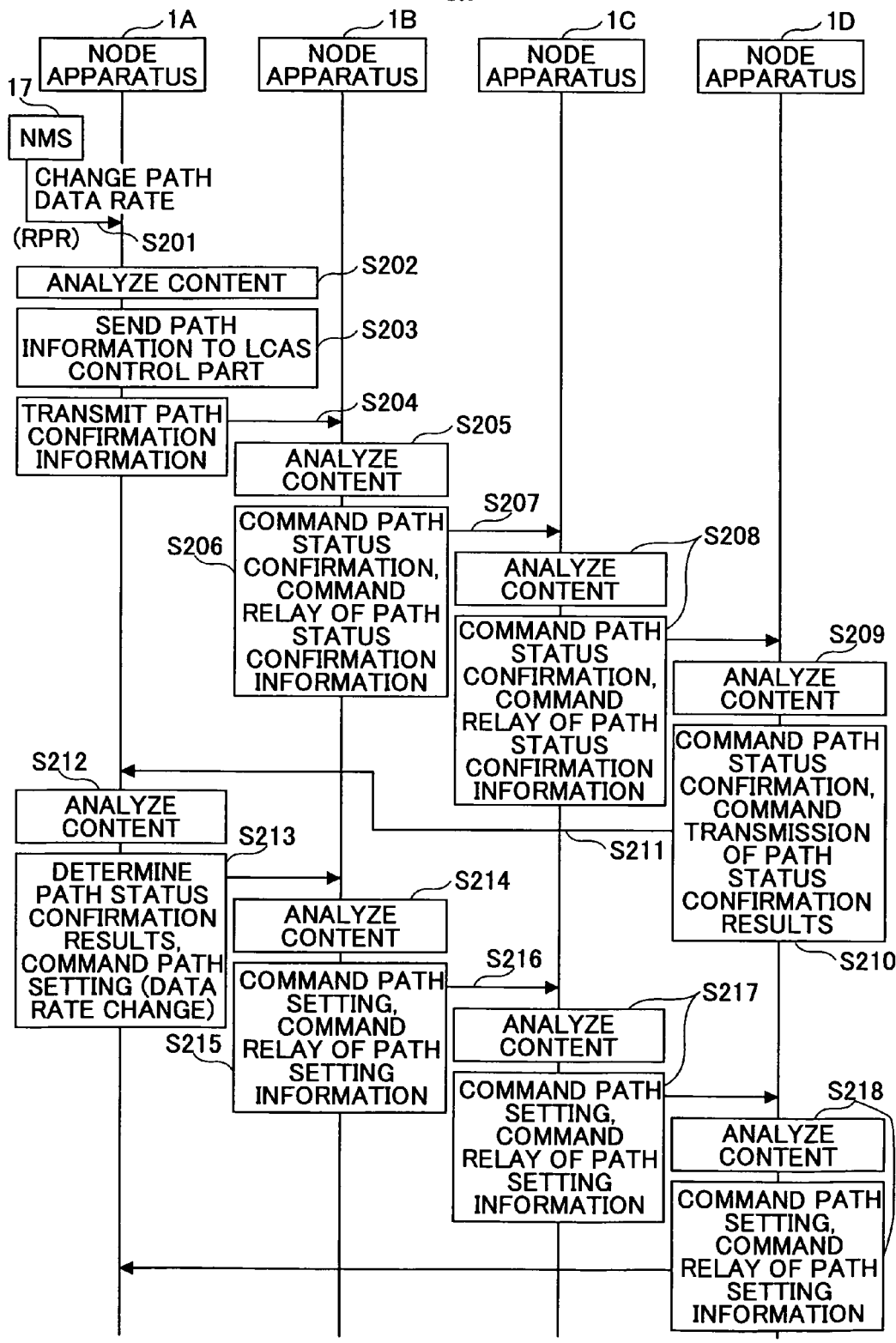
FIG. 11 is a flowchart showing an operation using Method 2 according to an embodiment of the present invention (Part 1)
Figure 12:
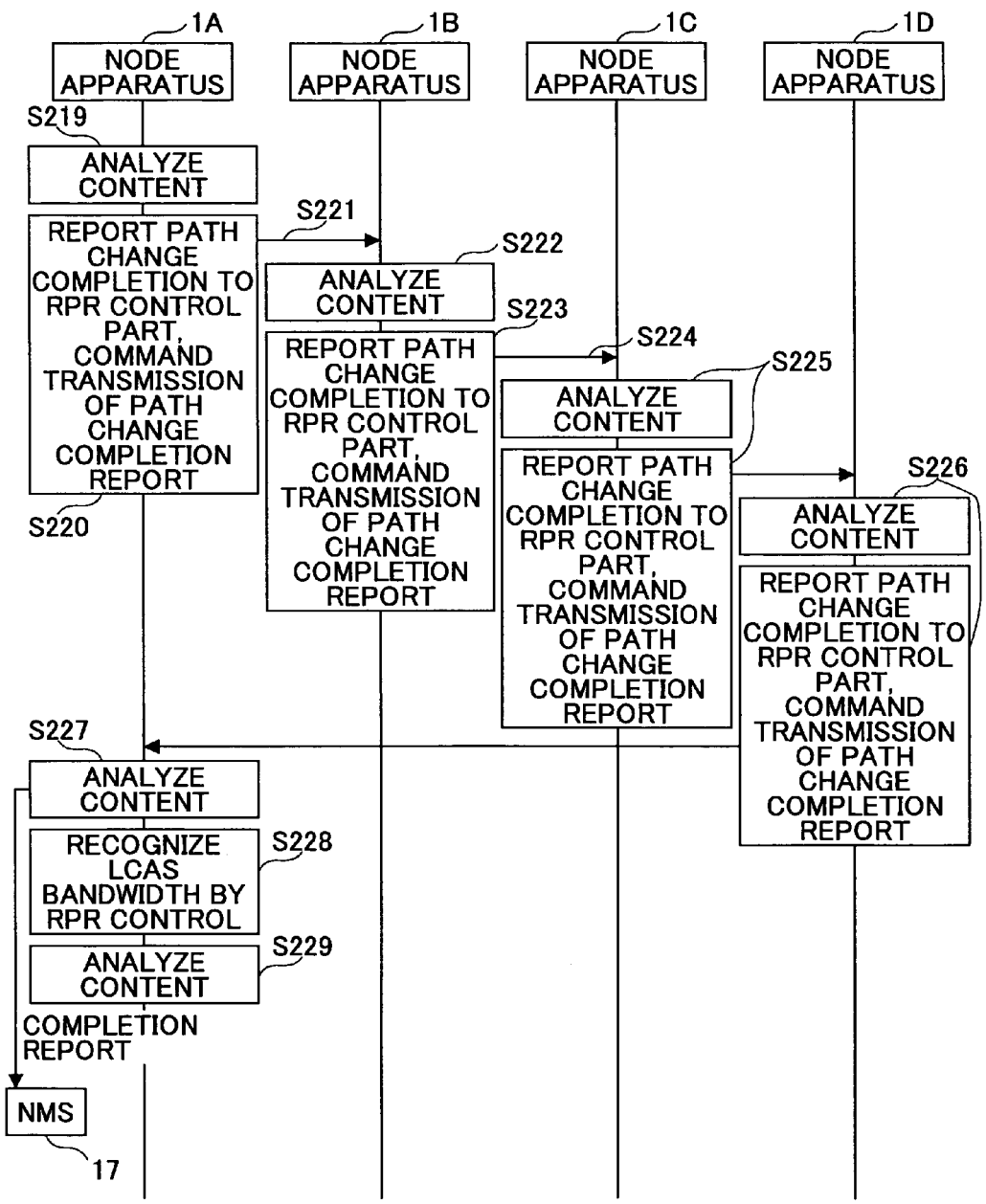
FIG. 12 is a flowchart showing an operation using Method 1 according to an embodiment of the present invention (Part 2).

A function of performing the processes below in accordance with the controls of the network management system 17
  a. analyzing the starting point/terminating point
  b. analyzing the data rate to be changed
  c. directing transmission of LCAS control information according to the analyzed results A function of performing the processes below in accordance with the controls of the RPR control part 15
  a. analyzing the starting point/terminating point
  b. analyzing the data rate to be changed
  c. directing the transmission of LCAS control information according to the analyzed results A function of providing the apparatus ID of the starting point or the number of hops remaining in the ring (other nodes remaining in the ring) to the counter (node counter, remaining node counter) for enabling confirmation of normality upon transmitting LCAS information to other node apparatuses (As an alternative method for confirming/controlling the normality of all the node apparatuses, the OPS and the normality of each node apparatus can be confirmed and the normality of the entire sections is determined solely according to the OPS)
(4) The RPR control information transmitting/receiving part 13 includes the functions described below.
A function of reporting the amount of packets flowing into the Ethernet signal processing part 7 (from the interface or the cross-connection part 6) to the RPR control information analyzing part 14
A function of distinguishing between "RPR Topology Information", "OAM Information", "Fairness Information", and "RPR Available Band Information" based on Control Type included in the RPR control frame received from the RPR control information transmitting/receiving part 13 of another node apparatus, and transferring the control type information to the RPR control information analyzing part 14.
(5) The RPR control information analyzing part 14 includes the functions described below.
A function of performing the analysis below according to the control type information transferred from the RPR control information transmitting/receiving part 13 and the amount of packets flowing into the Ethernet signal processing part 7.
  a. determining whether a relationship of "RPR bandwidth≦amount of packets flowing into the Ethernet signal processing part 7 from the interface and the cross-connection part 6" is satisfied
  b. determining whether there is any change of RPR status owing to failure in the ring by referring to the RPR topology information
  c. determining whether there is any occurrence of failure in a particular part by referring to the OAM information
  d. determining whether there are any available bands in the RPR ring by referring to the fairness information
  e. determining whether there are any VCAT paths to which Ethernet frames can be transmitted by referring to the RPR available band information
(6) The RPR control part 15 includes the functions described below.
A function of performing the processes below in accordance with the controls of the network management system 17
  a. instructing the RPR control information transmitting/receiving part 13 to control the inflowing amount of Ethernet signal frames
  b. instructing the RPR control information transmitting/receiving part 13 to transmit RPR control frames
  c. instructing the Ethernet signal processing part 7 to control the transmission amount of Ethernet signal frames
  d. instructing the RPR control information transmitting/receiving part 13 to control the inflowing amount of Ethernet signal frames
  e. instructing the RPR control information transmitting/receiving part 13 to allow transmission to a designated VCAT path
  f. notifying the LCAS control part 11 of the increase/reduction amount of RPR bandwidth
A function of stopping/starting the transmission of data to a designated LCAS band (band targeted for increase/reduction) during RPR control
[Data Format]
FIG. 6 is a schematic diagram showing an exemplary format of H4 byte information used for LCAS control. The H4 byte information includes defined bytes and reserve bytes. The LCAS identification information is transferred by using the reserve bytes.
FIG. 7 is a diagram showing an exemplary format of an RPR control frame used for RPR control. The RPR control frame includes an RPR header, Control Type, Control Version, Control Data Unit, and FCS. In this example, the Control Type is used for defining whether the control frame is one that includes either RPR topology information, OAM information, or Fairness information. Accordingly, information is transferred by using this control information.
[Operation Sequence of a System Configuration Using Method 1]
An operation using an exemplary arrangement of node apparatuses illustrated in FIG. 8 is described with reference to FIGS. 9 and 10.
(1) The operator operates the network management system 17, and performs control for changing (increasing/reducing) the path data rate (path data rate change) on a node apparatus (in this example, node apparatus 1A) by using the LCAS function (i.e. by transmitting LCAS control information to the node apparatus 1A) (Steps S101). The control information may be for a case where the change of the entire ring is executed in a batch (single process), or for a case where the change is executed by selecting a starting point and a terminating point of a path targeted for data rate change. In either case, data rate information of the path being targeted for change is included in the control information.
(Example of Control Information)
Change of entire ring
Change data rate from VC4-2V (corresponding to approximately 300 MB) to VC4-5V (corresponding to approximately 750 MB)
(2) In the node apparatus 1A receiving the LCAS control information from the network management system 17, the LCAS control part 11 obtains the LCAS control information via the monitor control part 16 and analyzes the content of the control information (Step S102). Furthermore, the node apparatus 1A instructs the cross-connection part 6 and the VCAT path processing part 5 to confirm the status of the path (path status confirmation).
(3) In accordance with the results of the analysis of the control information, the node apparatus 1A inserts path status confirmation information in the H4 byte information and transmits the H4 byte information into the transmission path 2 (Step S103). Information regarding the starting point (in a case of designating two points, starting point and terminating point) of the path targeted for data rate change and information regarding the data rate to be changed (changed data rate) is input to the path status confirmation information.
(Example of Path Status Confirmation Information)
Starting Point: node apparatus 1A (node counter=1)
Changed data rate from VC4-2V to VC4-5V
(4) The node apparatus 1B, receiving the H4 byte information including the path status confirmation information from the node apparatus 1A, extracts the path confirmation information and analyzes the content of the path status confirmation information at the LCAS control information analyzing part 10 (Step S104).
(Example of Analysis Results)
(a) The content is an instruction to confirm path status
(b) Node apparatus B (itself) is not a node apparatus of the starting point (starting point node apparatus) (node counter+1=2)
(c) Change data rate from VC4-2V to VC4-5V (5) In accordance with the analysis results, the LCAS control part 11 of the node apparatus 1B gives the following commands (Step S105).
   Command the LCAS control information transmitting/receiving part 9 to relay the path status confirmation information to node apparatus 1C
   Command the cross-connection part 6 and the VCAT path processing part 5 to confirm the status of the path (e.g. existence of any available path channels, failures)
(6) The LCAS control information transmitting/receiving part 9 of the node apparatus 1B relays (transfers) the path confirmation information to the node apparatus 1C (Step S106).
(7) The node apparatus 1C, receiving the transferred path status confirmation information, performs the above-described operations (4)-(6), and further relays (transfers) the path status confirmation information to node apparatus 1D (Step S107).
(8) The node apparatus 1D, receiving the transferred path status confirmation information from the node apparatus 1C, extracts the path confirmation information and analyzes the content of the path status confirmation information at the LCAS control information analyzing part 10 (Step S108). The analysis results are transmitted to the LCAS control part 11. In accordance with the analysis results, the LCAS control part 11 of the node apparatus 1D gives the following commands (Step S109).
   Command the cross-connection part 6 and the VCAT path processing part 5 to confirm the status of the path (e.g. existence of any available path channel, failures)
   Command the LCAS control information transmitting/receiving part 9 to transmit the results of the path status confirmation to the node apparatus 1A
(9) The LCAS control information transmitting/receiving part 9 of the node apparatus 1D inserts the results of the path status confirmation (path status confirmation results) into the H4 byte information.
(10) The LCAS control information transmitting/receiving part 9 of the node apparatus 1D transfers the H4 byte information to the node apparatus 1A (Step S110).
(11) The node apparatus 1A, receiving the H4 byte information from the node apparatus 1D, extracts the path status confirmation results from the H4 byte information and analyzes the content of the path confirmation information at the LCAS control information analyzing part 10 (Step S111). The analysis results are transmitted to the LCAS control part 11.
[Example of Analysis Results]
(a) The content is an instruction to confirm path status confirmation results
(b) Node apparatus A (itself) is the node apparatus of the starting point (starting point node apparatus) (node counter=4 (number of nodes unchanged))
(c) Set (Change) data rate from VC4-2V to VC4-5V
(12) In a case where the LCAS control part 11 of the node apparatus 1A recognizes the node apparatus 1A (itself) as the starting point node apparatus and determines that path status confirmation results are normal, the LCAS control part 11 gives the following commands to the LCAS control information transmitting/receiving part 9 (Step S112).
   Starting Point ID=1, remaining node counter=3 (ring relaying 3 node apparatuses)
   Set (Change) data rate from VC4-2V to VC4-5V
(13) The node apparatus 1B, receiving the H4 byte information including path setting information from the node apparatus 1A, extracts path setting information and analyzes the content of the path setting information at the LCAS control information analyzing part 10 (Step S113). The analysis results are transmitted to the LCAS control part 11.
[Example of Analysis Results]
   The content. is an instruction to set the path
   Node apparatus 1B itself is not the starting point node apparatus (remaining node counter 3−1=2)
   Set (Change) data rate from VC4-2V to VC4-5V
(14) In accordance with the analysis results, the LCAS control part 11 of the node apparatus 1B gives the following commands (Step S114).
   Command the LCAS control information transmitting/receiving part 9 to relay the path confirmation information to node apparatus 1C
   Command the cross-connection part 6 and the VCAT path processing part 5 to set the path
(15) The LCAS control information transmitting/receiving part 9 of the node apparatus 1B transfers the path setting information to the node apparatus 1C (Step S115).
(16) The node apparatus 1C, receiving the transferred path setting information from the node apparatus 1B, performs the operations of the above-described operations (13)-(14) and transfers the path setting information to the node apparatus 1D (Step S116).
(17) The node apparatus 1D, receiving the transferred path setting information from the node apparatus 1C, performs the above-described (13)-(14) and transfers the path setting results to the node apparatus 1A (Step S117).
(18) The node apparatus 1A, receiving the path setting information from the node apparatus 1D, extracts the path setting results and analyzes the content of the path setting results at the LCAS control information analyzing part 10 (Step S118). The results of the analysis are sent to the LCAS control part 11.
[Example of Analysis Results]
   The content is an instruction to set the path
   Node apparatus A (itself) is the starting point node apparatus (ID=1, remaining node counter=0)=terminating node apparatus
   According to the path setting results, path setting (path change) for all sections is completed
   Transmit completion of path setting (path change) with H4 byte information
(19) In accordance with the analysis results, the LCAS control part 11 of the node apparatus 1A gives the following commands (Step S119).
   Report completion of path change to the RPR control part 15
   Command LCAS control information transmitting/receiving part to transmit path band change completion report to the node apparatus 1B by using H4 byte information
(20) The LCAS control information transmitting/receiving part 9 of the node apparatus 1A transmits a path band change completion report to the node apparatus 1B by using the H4 byte information (i.e. transmitting LCAS control signals) (Step S120).
(21) The node apparatus 1B, receiving the LCAS control signals from the node apparatus 1A, extracts the path change completion report and analyzes the content of the path setting completion report at the LCAS control information analyzing part 10 (Step S121).
[Example of Analysis Results]
   Node apparatus 1B (itself) is not the starting point node apparatus
   Transmit completion of path setting (path change) by using H4 byte information

(22) In accordance with the analysis results, the LCAS control part 11 of the node apparatus 1B gives the following commands (Step S122).
Report completion of path change to the RPR control part 15
Command the LCAS control information transmitting/receiving part 9 to transmit a path change completion report to the node apparatus 1C
(23) The LCAS control information transmitting/receiving part 9 of the node apparatus 1B transmits the path change completion report to the node apparatus 1C by using the H4 byte information (Step S123).
(24) The node apparatus 1C, receiving the LCAS control signal from the node apparatus 1B, performs the above-described operations (21)-(23) and transfers the path change completion report to the node apparatus 1D (Step S124).
(25) The node apparatus 1D, receiving the LCAS control signal from the node apparatus 1C, performs the above-described operations (21)-(23) and transfers the path change completion report (LCAS control signal) to the node apparatus 1A (Step S125).
(26) The node apparatus 1A, receiving the LCAS control signal from the node apparatus 1D, extracts the path band change completion report and analyzes the content of the path band change completion report at the LCAS control information analyzing part 10 (Step S126).
[Example of Analysis Results]
Node apparatus A (itself) is the starting point node apparatus
Entire LCAS control is completed
(27) In accordance with the path change completion report transmitted from the LCAS control part 11 to the RPR control part 15, the RPR control part 15 of each node apparatus 1A-1D recognizes the LCAS bandwidth (Step S127). Then, each node apparatus 1A-1D operates according to the RPR function (Step S128).
(28) In a case where the RPR control part 15 recognizes that the LCAS band has surplus (available) bandwidth, the Ethernet signal processing part 7 is permitted to change Ethernet signals.
(29) The RPR control information transmitting/receiving part 13 extracts the following RPR control frame information from the Ethernet signal processing part 7, and transmits the extracted information to the RPR control information analyzing part 14.
RPR control frame information: "RPR topology information", "OAM control information", "Fairness control information"
(30) In accordance with the RPR control frame information transferred from the RPR control information transmitting/receiving part 13 to the RPR control information analyzing part 14, the following analysis is performed.
Analyzing whether the RPR status is normal
Analyzing whether the inflowing Ethernet data is greater than a predetermined path bandwidth (path capacity). (In a case where the inflowing Ethernet data is greater than the predetermined bandwidth, the inflow amount of an adjacent node apparatus is controlled)
(31) In accordance with the analysis results, the RPR control part 15 performs the following controls.
Transmit an RPR control frame dedicated to restrain the transmission amount with respect to an upper level (upstream) node apparatus that is transmitting excess frames
Transmit an RPR control frame dedicated to performing switching in a case where the state of RPR is abnormal
Transmit an RPR control frame dedicated to switching back in a case where the abnormal state of RPR is restored.
(32) When the RPR control information transmitting/receiving part 13 receives the transmitted RPR control frame, the RPR control information analyzing part 14 analyzes the content of the transmitted RPR control frame, and the RPR control part 15 performs RPR control in accordance with the analyzed results. Thereby, the amount of Ethernet frames flowing into the ring is adjusted.
(33) A completion report is sent to the network management system 17 when the LCAS completion report of operations (27) safely reaches the RPR control information transmitting/receiving part 13. Operations following the completion report are performed automatically by the RPR function.
[Operation Sequence of a System Configuration Using Method 2]
(1) The operator operates the network management system 17, and performs RPR bandwidth change (increase/reduction) control on a node apparatus (in this example, node apparatus 1A) by using the RPR function (Steps S201). A node apparatus which is to be the starting point for RPR control and LCAS control is selected. The node apparatus which is to be the starting point may be any node apparatus within the system (within the ring). The bandwidth, which is to be changed by LCAS, may be automatically calculated or manually designated according to the capacity designated by the RPR bandwidth.

EXAMPLE

|  | Present State |  | Changed state |
|---|---|---|---|
| RPR Increase: | 200 MB | → | 500 MB |
| Path Capacity: | VC-2V (300 MB) | → | VC4-4V (600 MB) |

It is to be noted that LCAS is inoperable when increasing the RPR amount with Method 2 in a case where a relationship of "(Changed RPR amount)≦(LCAS path bandwidth)" is satisfied.

EXAMPLE

|  | Present State |  | Changed State |
|---|---|---|---|
| RPR Increase: | 200 MB | → | 300 MB |
| Path Capacity: | VC4-2V (300 MB) | → | No change (Inoperable) |

(2) In the node apparatus 1A receiving control information from the network management system 17, the RPR control part 15 obtains the control information via the monitor control part 16 and analyzes the content of the control information (Step S202). Furthermore, the cross-connection part 6 and the VCAT path processing part 5 performs path status confirmation (available path channel, existence of any failures).
(3) In a case where the node apparatus 1A analyzes (determines) that the relationship of (RPR bandwidth)≦(Present path bandwidth) is satisfied and determines that path increase (LCAS control) is necessary, the node apparatus 1A sends LCAS path bandwidth information to the LCAS control part 11 (in a case where LCAS increase is set manually, this step is omitted) (Step S203).

(4) In accordance with the analysis results, the LCAS control part 11 inserts path confirmation information into H4 byte information and transmits the H4 byte information to the transmission path 2 (Step S204). The path confirmation information includes, for example, information regarding the starting point of the path targeted for data rate change (information regarding the starting point and the terminating point in a case where two points are designated), and information regarding the data rate which is to be changed.

(Example of Path Confirmation Information)
 Starting point: node apparatus 1A (node counter=1)
 Change data rate from VC4-2V to VC4-5V (5) The node apparatus 1B, receiving the H4 byte information including the path confirmation information from the node apparatus 1A, extracts the path confirmation information and analyzes the content of the path confirmation information at the LCAS control information analyzing part 10 (Step S205). The analysis results are transmitted to the LCAS control part 11.

(Example of Analysis Results)
 (a) The instruction is to confirm the path status
 (b) Node apparatus 1B (itself) is not the starting point (node counter+1=2)
 (c) Change data rate from VC4-2V to VC4-5V (6) In accordance with the analysis results, the LCAS control part 11 of the node apparatus 1B gives the following commands (Step S206).
 A command instructing the LCAS control information transmitting/receiving part 9 to relay the path confirmation information to the node apparatus 1C
 A command instructing the cross-connection part 6 and the VCAT path processing part 5 to confirm the path status (e.g. existence of any available path channels, failures)

(7) The LCAS control information transmitting/receiving part 9 of the node apparatus 1B transfers (relays) the path confirmation information to the node apparatus 1C (Step S207).

(8) The node apparatus 1C, receiving the transferred path confirmation information, performs the above-described operations (5)-(7) and transfers the path confirmation information to the node apparatus 1D (Step S208).

(9) The node apparatus 1D, receiving the transferred path confirmation information from the node apparatus 1C, extracts the path confirmation information and analyzes the content of the path confirmation information at the LCAS control information analyzing part 10 (Step S209). The analysis results are transmitted to the LCAS control part 11. In accordance with the analysis results, the LCAS control part 11 of the node apparatus 1D gives the following commands (Step S210).
 A command instructing the cross-connection part 6 and the VCAT path processing part 5 to confirm the path status (e.g. existence of any available path channels, failures)
 A command instructing the LCAS control information transmitting/receiving part 9 to transmit the results of the path status confirmation to the node apparatus 1A

(10) The LCAS control information transmitting/receiving part 9 of the node apparatus 1D inserts the path status confirmation results into the H4 byte information.

(11) The LCAS control information transmitting/receiving part 9 of the node apparatus 1D transfers the H4 byte information to the node apparatus 1A (Step S211).

(12) The node apparatus 1A, receiving the H4 byte information from the node apparatus 1D, extracts the path confirmation information and analyzes the content of the path confirmation information at the LCAS control information analyzing part 10 (S212). The analysis results are transmitted to the LCAS control part 11.

(Example of Analysis Results)
 (a) The instruction is to confirm the path status
 (b) Node apparatus 1A (itself) is the starting point (starting point node apparatus) (node counter=4)
 (c) Change data rate from VC4-2V to VC4-5V

(13) When the LCAS control information analyzing part 10 of the node apparatus 1A recognizes that the node apparatus 1A (itself) is the starting point node apparatus, and determines that the path status confirmation of all of the node apparatuses 1A-1D is normal, the LCAS control part 11, receiving the path status confirmation results, gives the following commands to the LCAS control information transmitting/receiving part 9 (Step S213).
 Starting Point ID=1, remaining node counter=3 (ring relaying 3 node apparatuses)
 Change data rate from VC4-2V to VC4-5V

(14) The node apparatus 1B, receiving the H4 byte information from the node apparatus 1A, extracts path information and analyzes the content of the path information at the LCAS control information analyzing part 10 (Step S214). The analysis results are transmitted to the LCAS control part 11.

(Example of Analysis Results)
 The instruction is to set the path
 Node apparatus 1B (itself) is not the starting point (remaining node counter 1=2)
 Change data rate from VC4-2V to VC4-5V

(15) In accordance with the analysis results, the LCAS control part 11 of the node apparatus 1B gives the following commands (Step S215).
 A command instructing the LCAS control information transmitting/receiving part 9 to relay the path setting information to the node apparatus 1C
 A command instructing the cross-connection part 6 and the VCAT path processing part 5 to set the path

(16) The LCAS control information transmitting/receiving part 9 of the node apparatus 1B transfers the path setting information to the node apparatus 1C (Step S216).

(17) The node apparatus 1C, receiving the path setting information from the node apparatus 1B, performs the above-described operations (14)-(16) and transfers the path setting information to the node apparatus 1D (Step S217).

(18) The node apparatus 1D, receiving the path setting information from the node apparatus 1C, performs the above-described operations (14)-(16) and transfers the H4 byte information to the node apparatus 1A (Step S218).

(19) The node apparatus 1A, receiving the H4 byte information from the node apparatus 1D, extracts path information and analyzes the content of the path information at the LCAS control information analyzing part 10 (Step S219). The analysis results are transmitted to the LCAS control part 11.

(Example of Analysis Results)
 The instruction is to set the path
 Node apparatus 1A (itself) is the starting point (starting point node apparatus) (ID=1 and remaining node counter=0)=terminating point node apparatus. According to the analysis results, path setting for all section is completed
 Transmit completion of path setting with H4 byte information

(20) In accordance with the analysis results, the LCAS control part 11 of the node apparatus 1A gives the following commands (S220).
   Report completion of path band change to the RPR control part 15
   Command LCAS control information transmitting/receiving part to report completion of path band change to the node apparatus 1B by using H4 byte information
(21) The LCAS control information transmitting/receiving part 9 of the node apparatus 1A reports completion of the path band change to the node apparatus 1B by using the H4 byte information (i.e. transmitting LCAS control signals) (Step S221).
(22) The node apparatus 1B, receiving the LCAS control signals from the node apparatus 1A, extracts the path setting completion report and analyzes the content of the path setting completion report at the LCAS control information analyzing part 10 (Step S222).
[Example of Analysis Results]
   Node apparatus 1B (itself) is not the starting point node apparatus
   Transmit completion of path setting by using H4 byte information
(23) In accordance with the analysis results, the LCAS control part 11 of the node apparatus 1B gives the following commands (Step S223).
   Report completion of path band change to the RPR control part 15
   Command the LCAS control information transmitting/receiving part 9 to report completion of the path band change to the node apparatus 1C
(24) The LCAS control information transmitting/receiving part 9 of the node apparatus 1B reports completion of the path band change to the node apparatus 1C by using the H4 byte information (Step S224).
(25) The node apparatus 1C, receiving the LCAS control signal from the node apparatus 1B, performs the operations of the foregoing operations (22)-(24) and transfers the path band change completion report to the node apparatus 1D (Step S225).
(26) The node apparatus 1D, receiving the LCAS control signal from the node apparatus 1C, performs the above-described operations (22)-(24) and transfers the path band change completion report (LCAS control signal) to the node apparatus 1A (Step S226).
(27) The node apparatus 1A, receiving the LCAS control signal from the node apparatus 1D, extracts the path band change completion report and analyzes the content of the path band change completion report at the LCAS control information analyzing part 10 (Step S227).
[Example of Analysis Results]
   Node apparatus A (itself) is the starting point node apparatus
   LCAS control is completed
(28) In accordance with the path band change completion report transmitted from the LCAS control part 11 to the RPR control part 15, the RPR control part 15 of each node apparatus 1A-1D recognizes the LCAS bandwidth (Step S228). Then, each node apparatus 1A-1D operates according to the RPR function (Step S229).
(29) In a case where the RPR control part 15 of each node apparatus 1A-1D recognizes that the LCAS band has surplus (available) bandwidth, the RPR control information transmitting/receiving part 13 is permitted to change Ethernet signals.
(30) The RPR control information transmitting/receiving part 13 extracts the following RPR control frame information from the Ethernet signal processing part 7, and transmits the extracted information to the RPR control information analyzing part 14.
   RPR control frame information: "RPR topology information", "OAM control information", "Fairness control information"
(31) In accordance with the RPR control frame information transferred from the RPR control information transmitting/receiving part 13 to the RPR control information analyzing part 14, the following analysis is performed.
   Analyzing (Calculating) the amount of Ethernet frames that can be increased
   Analyzing whether the RPR status is normal
   Analyzing the amount of frames in the Ethernet signal processing part (In a case where the inflowing data are greater than a predetermined bandwidth, the inflow amount of an adjacent node apparatus is controlled)
(32) In accordance with the analysis results, the RPR control part 15 performs the following controls.
   Transmit an RPR control frame dedicated to restrain the transmission amount with respect to an upper level (upstream) node apparatus that is transmitting excess frames
   Transmit an RPR control frame dedicated to perform switching in a case where the state of RPR is abnormal
   Transmit an RPR control frame dedicated to switching back in a case where the abnormal state of RPR is restored.
(33) When the RPR control information transmitting/receiving part 13 of the node apparatus 1B and/or the node apparatus 1D (i.e. adjacent node apparatuses) receives the transmitted RPR control frame, the RPR control information analyzing part 14. analyzes the content of the transmitted RPR control frame, and the RPR control part 15 performs RPR control in accordance with the analyzed results. Accordingly, the RPR control information transmitting/receiving part 13 of the node apparatus 1B and/or the node apparatus 1D transmit an RPR control frame for adjusting the amount of Ethernet frames flowing into the ring with respect to an adjacent node.
(34) When the RPR control information transmitting/receiving part 13 of the node apparatus 1C (i.e. adjacent node apparatus) receives the RPR control frame from the node apparatus B and/or the node apparatus 1D, the RPR control information analyzing part 14 analyzes the content of the transmitted RPR control frame, and the RPR control part 15 performs RPR control in accordance with the analyzed results. Accordingly, the RPR control information transmitting/receiving part 13 of the node apparatus 1C transmits an RPR control frame for adjusting the amount of Ethernet frames flowing into the ring with respect to an adjacent node.
(35) The above-described operations continue until RPR control becomes stable (becomes a constant predetermined value). (Operation of RPR)
(36) A completion report is sent to the network management system 17 when the LCAS completion report of the above-described operation (28) safely reaches the RPR control information transmitting/receiving part 13. Operations following the completion report are performed continuously by the RPR function.

Accordingly, with the method and node apparatus according the above-described embodiment of the present invention, a function of adding/deleting paths between node apparatuses situated on a physical layer (e.g. LCAS function) and a function of a ring application operating on a data link layer (e.g. RPR function) can be cooperatively performed by suitably utilizing the control information of the respective functions. Thereby, path addition/deletion (i.e. bandwidth increase/decrease, data rate increase/reduction) can be achieved while confirming the normality of the ring network. This enables efficient data transmission while flexibly responding to changes in traffic. Furthermore, the process of making changes in the network can be achieved more efficiently and management of the network can be conducted more easily.

In other words, with the method and node apparatus according the above-described embodiment of the present invention, LCAS technology can be employed in an RPR system for achieving RPR increase/decrease while continuing the service in the network. Furthermore, by cooperatively utilizing LCAS and RPR, an RPR system in ADM (SONET) can achieve bandwidth increase/decrease without interrupting the service of the network. Furthermore, by automating the LCAS function in the ring network and taking advantage of the mechanism of the RPR function (the mechanism of automatically performing operation (control) whenever there is a change of bandwidth), operability of the network can be improved.

Further, the present invention is not limited to these embodiments, but variations and modifications may be made without departing from the scope of the present invention.

The present application is based on Japanese Priority Application No. 2005-282097 filed on Sep. 28, 2005, with the Japanese Patent Office, the entire contents of which are hereby incorporated by reference.

What is claimed is:

1. A method for controlling a physical bandwidth of a ring network including a plurality of node apparatuses, the method comprising:
    cooperatively using an RPR (Resilient Packet Ring) function of adjusting an amount of frames flowing on a data link layer and an LCAS (Link Capacity Adjustment Scheme) function of adding/deleting a predetermined path on a physical layer by transmitting predetermined control information to the plurality of node apparatuses, wherein the predetermined control information including an LCAS control information for controlling the LCAS function and an RPR control information for controlling the RPR function;
    confirming the status of a path corresponding to each node apparatus in the ring network by using the predetermined control information;
    instructing each node apparatus to add/delete the predetermined path on the physical layer while using the RPR function of the data link layer by using the predetermined control information when the status of the path corresponding to each node apparatus is confirmed to be normal;
    reporting completion of adding/deleting the predetermined path to each node apparatus by using the predetermined control information when the addition/deletion of the predetermined path is adequately performed by each node apparatus; and
    reporting the addition/deletion of the predetermined path to the RPR function of the data link layer by referring to the RPR function of the data link layer when the completion of the addition/deletion of the predetermined path is adequately reported by each node apparatus.

2. The method as claimed in claim 1, wherein the confirming of the path status is conducted in accordance with a path addition/deletion instruction from a network management system, wherein the path addition/deletion instruction is based on the function of adding/deleting the predetermined path on the physical layer.

3. The method as claimed in claim 2, further comprising:
    reporting completion of the addition/deletion of the predetermined path to the network management system when the addition/deletion of the predetermined path is adequately reported to the RPR function.

4. The method as claimed in claim 1, wherein the confirming of the path status is conducted in accordance with a path addition/deletion instruction from an upper level network management system, wherein the path addition/deletion instruction is based on the RPR function of the data link layer.

5. The method as claimed in claim 4, further comprising:
    reporting completion of the addition/deletion of the predetermined path to the network management system when the addition/deletion of the predetermined path is adequately reported to the RPR function.

6. The method as claimed in claim 1, wherein the path of the physical layer includes at least one of a SDH band and a SONET band.

7. The method as claimed in claim 1, wherein the use of the predetermined control information includes the use of H4 byte information.

8. A node apparatus for controlling a physical bandwidth of a ring network including a plurality of node apparatuses, the node apparatus comprising:
    a path status confirming part for confirming the status of a path corresponding to each node apparatus in the ring network by using predetermined control information that includes an LCAS (Link Capacity Adjustment Scheme) control information for controlling an LCAS function of adding/deleting a predetermined path on a physical layer and an RPR (Resilient Packet Ring) control information for controlling an RPR function of adjusting an amount of frames flowing on a data link layer;
    a path addition/deletion instructing part for instructing each node apparatus to add/delete the predetermined path on the physical layer while using the RPR function of the data link layer by using the predetermined control information when the status of the path corresponding to each node apparatus is confirmed to be normal;
    a path addition/deletion completion reporting part for reporting completion of the addition/deletion of the predetermined path to each node apparatus by using the predetermined control information when the addition/deletion of the predetermined path is adequately performed by each node apparatus; and
    a path addition/deletion reporting part for reporting the addition/deletion of the predetermined path to the RPR function of the data link layer by referring to the RPR function of the data link layer when the completion of the addition/deletion of the predetermined path is adequately reported by each node apparatus;
    wherein the node apparatus is configured to cooperatively use the RPR function of the data link layer and the LCAS function of the physical layer based on the predetermined control information being transmitted to all of the plural node apparatuses.

* * * * *